US012792005B1

(12) United States Patent
Miller

(10) Patent No.: US 12,792,005 B1
(45) Date of Patent: Nov. 10, 2026

(54) PROACTIVE SURGE POWER AUGMENTATION SYSTEM AND METHOD FOR NUMERICALLY CONTROLLED MACHINE TOOLS

(71) Applicant: John Edward Miller, Lebanon, OH (US)

(72) Inventor: John Edward Miller, Lebanon, OH (US)

( * ) Notice: Subject to any disclaimer, the term of this patent is extended or adjusted under 35 U.S.C. 154(b) by 0 days.

(21) Appl. No.: 19/543,287

(22) Filed: Feb. 18, 2026

(51) Int. Cl.
*G01R 31/64* (2020.01)
*G05B 19/408* (2006.01)
*G05B 19/4093* (2006.01)
*G05B 19/416* (2006.01)

(52) U.S. Cl.
CPC ... *G05B 19/4083* (2013.01); *G05B 19/40938* (2013.01); *G05B 19/416* (2013.01); *G05B 2219/32001* (2013.01); *G05B 2219/36019* (2013.01); *G05B 2219/43001* (2013.01)

(58) Field of Classification Search
CPC .. G01R 31/64; H02P 5/74; B66B 1/30; G05B 19/4083; G05B 19/40938; G05B 2219/32001
See application file for complete search history.

(56) References Cited

U.S. PATENT DOCUMENTS

| | | | |
|---|---|---|---|
| 4,233,858 A | 11/1980 | Rowlett | |
| 5,808,448 A | 9/1998 | Naito | |
| 6,242,884 B1 | 6/2001 | Lipo et al. | |
| 8,897,943 B2 | 11/2014 | Sheidler et al. | |
| 9,126,591 B2 | 9/2015 | Johri et al. | |
| 10,792,539 B1 | 10/2020 | Gilstrom et al. | |
| 11,278,435 B2 | 3/2022 | Milliken et al. | |
| 2001/0017234 A1* | 8/2001 | Suga | B66B 1/30 187/290 |

(Continued)

FOREIGN PATENT DOCUMENTS

| | | |
|---|---|---|
| CN | 115142784 | 10/2022 |
| CN | 116500970 | 7/2023 |

(Continued)

*Primary Examiner* — Cortez M Cook
(74) *Attorney, Agent, or Firm* — The Concept Law Group, PA; Scott D. Smiley; Scott M. Garrett

(57) ABSTRACT

A proactive power augmentation system and method for numerically controlled machine tools enables temporary increases in spindle or axis drive power beyond the continuous rating of the primary grid power supply. During computer-aided manufacturing (CAM) processing, high-demand operations—such as heavy roughing or those prone to tool chatter—are identified, and the machine instruction code (e.g., G-code) is augmented with proactive commands to enable a secondary energy storage source (e.g., battery bank or ultracapacitor) immediately prior to execution. This preemptive supplementation prevents reactive delays, maintains optimal tool speed and stability, and achieves higher instantaneous material removal rates without requiring facility electrical upgrades. Post-operation, the secondary source is disabled, and regenerative charging from machine momentum replenishes stored energy. The architecture supports various motor configurations (single/dual stator or motor) and is retrofittable to existing machines.

16 Claims, 8 Drawing Sheets

(56) References Cited

U.S. PATENT DOCUMENTS

| | | | | |
|---|---|---|---|---|
| 2014/0372050 | A1* | 12/2014 | Kanda .................... | G01R 31/64 702/57 |
| 2020/0343836 | A1* | 10/2020 | Shinoda .................... | H02P 5/74 |
| 2021/0126562 | A1 | 4/2021 | Asada et al. | |
| 2024/0375636 | A1 | 11/2024 | Nelson et al. | |
| 2025/0050486 | A1 | 2/2025 | Minnickel et al. | |
| 2025/0100539 | A1 | 3/2025 | Graham et al. | |

FOREIGN PATENT DOCUMENTS

| | | |
|---|---|---|
| CN | 219600907 | 8/2023 |
| DE | 102019125990 | 4/2021 |
| DE | 102021212071 | 4/2023 |
| EP | 3106361 | 12/2016 |

* cited by examiner

PROACTIVE SURGE POWER AUGMENTATION SYSTEM AND METHOD FOR NUMERICALLY CONTROLLED MACHINE TOOLS

FIELD OF THE INVENTION

The present invention relates generally to power augmentation of machinery used to process material into a finished part, and, more particularly, relates to providing power surges during times of increased loading on the machinery as the machinery operates on the material to produce the finished part or part, and wherein the power surge is provided proactively, rather than in response to detecting an increased load on the machinery.

BACKGROUND OF THE INVENTION

There is a wide variety of machinery that operates on a piece of material to produce a finished, or roughly finished part. Examples of such machines include routers and profilers, vertical and horizontal machining centers, vertical turning lathes, bridge or gantry mills, and grinding/boring machines. In all of these, a cutting tool acts on material to remove material from a blank or workpiece. It is often the case that in completing the milling of the blank, one or more operations require more power that the motor of the mill is rated to provide for continuous operation. It is not uncommon to allow momentary power surge above the continuous rating. The typical way this is achieved is by sensing the load on the machine, and in response to detecting an increased load, switching in additional power for either a limited time period or until the load level decreases to the point where the ordinary power is suitable to continue.

This reactive method of power augmentation, although it allows the operation to be completed, is not without issues. When the machine is initially loaded, for example, the tool being operated by the machine may not be moving at an optimum speed, potentially resulting in chatter due to vibration of the tool, which can produce cutting that requires additional finishing, or in some cases damaging the workpiece in a way that renders it unusable. This is caused by the fact that supplemental power is provided reactively, requiring the loading effect to occur first, so that the increased loading can be detected and then responded to. But this necessitates a brief delay between detecting the increased load, and providing the supplemental power to the motor of the machine.

Therefore, a need exists to overcome the problems with the prior art as discussed above.

SUMMARY OF THE INVENTION

In accordance with some embodiments of the inventive disclosure, there is provided a method for generating machine instruction code for a numerically controlled machine tool having a primary power source and a secondary power source. The method includes defining a plurality of machining operations to produce a finished part from a workpiece using a tool, and identifying one or more operations among the plurality of machining operations where additional power from the secondary power source is needed to ensure proper machining by the tool. The method further includes generating the machine instruction code to include proactive directions to enable the secondary power source for the identified one or more operations, and providing the machine instruction code to the numerically controlled machine tool for execution.

In accordance with a further feature, the machine instruction code comprises G-code.

In accordance with a further feature, the identified one or more operations include roughing operations, high material removal rate operations, or operations prone to tool chatter or suboptimal tool speed when powered only by the primary power source.

In accordance with a further feature, identifying the one or more operations is performed during computer-aided manufacturing (CAM) processing based on at least one of tool type, workpiece material, removal volume, or predefined high-demand criteria.

In accordance with some embodiments of the inventive disclosure, there is provided a method for operating a numerically controlled machine tool having a primary power source and a secondary power source. The method includes receiving machine instruction code defining a sequence of machining operations. The machine instruction code including proactive directions to enable the secondary power source for selected operations. The method further includes preparing for a next operation in the sequence, determining from the proactive directions in the machine instruction code whether the next operation requires the secondary power source, and when the next operation requires the secondary power source, proactively enabling the secondary power source prior to performing the next operation. The method further includes performing the next operation using power from the primary power source and, when enabled, the secondary power source, and after performing the next operation, when the secondary power source was enabled for the operation, disabling the secondary power source.

In accordance with a further feature, proactively enabling the secondary power source occurs immediately prior to initiating tool motion or cutting for the next operation.

In accordance with a further feature, the method further includes regeneratively recharging the secondary power source from kinetic energy of the numerically controlled machine tool, wherein the regenerative recharging overlaps in time with at least a portion of a subsequent operation that does not require the secondary power source.

In accordance with a further feature, the method further includes passively recharging the secondary power source from the primary power source during periods of low power demand in the sequence of machining operations.

In accordance with some embodiments of the inventive disclosure, there is provided a numerically controlled machine tool system that includes a machine tool including a motor configured to drive a tool for performing machining operations on a workpiece. The system further includes a primary power source configured to supply power to the motor for normal machining operations, and a secondary power source comprising an energy storage device. There is an energy management circuit coupled between the secondary power source and the motor. The energy management circuit including a controllable switch to selectively connect the secondary power source to the motor. There is a machine controller configured to execute machine instruction code defining the machining operations. The machine instruction code includes proactive commands to control the controllable switch. The machine controller is configured to interpret the proactive commands in the machine instruction code to proactively enable the switch and connect the secondary power source to the motor immediately prior to performing selected high-demand operations identified in the machine instruction code, and disable the switch after the selected machining operations.

In accordance with a further feature, the motor includes a primary stator powered by the primary power source, and the energy management circuit is configured to couple the secondary power source to the primary stator via the controllable switch when enabled.

In accordance with a further feature, the motor includes a primary stator powered by the primary power source and a separate secondary stator, and the energy management circuit is configured to supply power from the secondary power source to the secondary stator via the controllable switch when enabled.

In accordance with a further feature, the motor is a primary motor, the system further comprising a secondary motor mechanically coupled to the primary motor via a coupling mechanism, wherein the secondary motor is powered by the secondary power source when the controllable switch is enabled.

In accordance with a further feature, the system further includes a regenerative charging circuit configured to recharge the secondary power source from kinetic energy of the motor or tool after the controllable switch is disabled.

In accordance with a further feature, the system further includes a passive charging circuit configured to recharge the secondary power source from the primary power source during periods when power demand is below a predefined threshold.

In accordance with a further feature, the energy storage device comprises at least one of a battery bank, a lithium-titanate (LTO) battery module, an ultracapacitor bank, or a hybrid storage unit.

In accordance with a further feature, the secondary power source is connected to a primary DC bus of the machine tool.

In accordance with a further feature, the machine tool comprises at least one of a CNC milling machine, a vertical machining center (VMC), a horizontal machining center (HMC), a turning center, a turn-mill center, a bridge mill, a gantry mill, a portal mill, a grinding machine, or a boring machine.

In accordance with a further feature, the proactive commands in the machine instruction code are generated during computer-aided manufacturing (CAM) processing to anticipate high-demand operations.

In accordance with a further feature, the selected high-demand operations include roughing operations or operations requiring torque or power above a continuous rating of the primary power source.

In accordance with a further feature, the energy management circuit is configured for retrofitting to existing machine tools via modular connections to the primary DC bus or auxiliary drive interfaces.

Although the invention is illustrated and described herein as embodied in a proactive power surge system and method for CNC machine operations, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms “a” or “an,” as used herein, are defined as one or more than one. The term “plurality,” as used herein, is defined as two or more than two. The term “another,” as used herein, is defined as at least a second or more. The terms “including” and/or “having,” as used herein, are defined as comprising (i.e., open language). The term “coupled,” as used herein, is defined as connected, although not necessarily directly, and not necessarily mechanically. The term “providing” is defined herein in its broadest sense, e.g., bringing/coming into physical existence, making available, and/or supplying to someone or something, in whole or in multiple parts at once or over a period of time.

“In the description of the embodiments of the present invention, unless otherwise specified, azimuth or positional relationships indicated by terms such as “up”, “down,” “left,” “right,” “inside,” “outside,” “front,” “back,” “head,” “tail” and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as “first,” “second,” “third,” and so on are only used for descriptive purposes and cannot be construed as indicating or implying relative importance.

In the description of the embodiments of the present invention, it should be noted that, unless otherwise clearly defined and limited, terms such as “installed,” “coupled,” “connected” should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms “about” or “approximately” apply to all numeric values, whether or not explicitly indicated. These terms generally refer to a range of numbers that one of skill in the art would consider equivalent to the recited values (i.e., having the same function or result). In many instances, these terms may include numbers that are rounded to the nearest significant figure. In this document, the term “longitudinal” should be understood to mean in a direction corresponding to an elongated direction of the article being referenced. The terms “program,” “software application,” “machine code,” “G-code,” and the like as used herein, are defined as a sequence of instructions designed for execution on a computer or computer-controlled system. A "program," "computer program," or "software application" may include a subroutine, a function, a procedure, an object method, an object implementation, an executable application, an applet, a servlet, a source code, an object code, a shared library/dynamic load library and/or other sequences of instructions designed for execution on a computer system. Those skilled in the art can understand the specific meanings of the above-mentioned terms in the embodiments of the present invention according to the specific circumstances.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
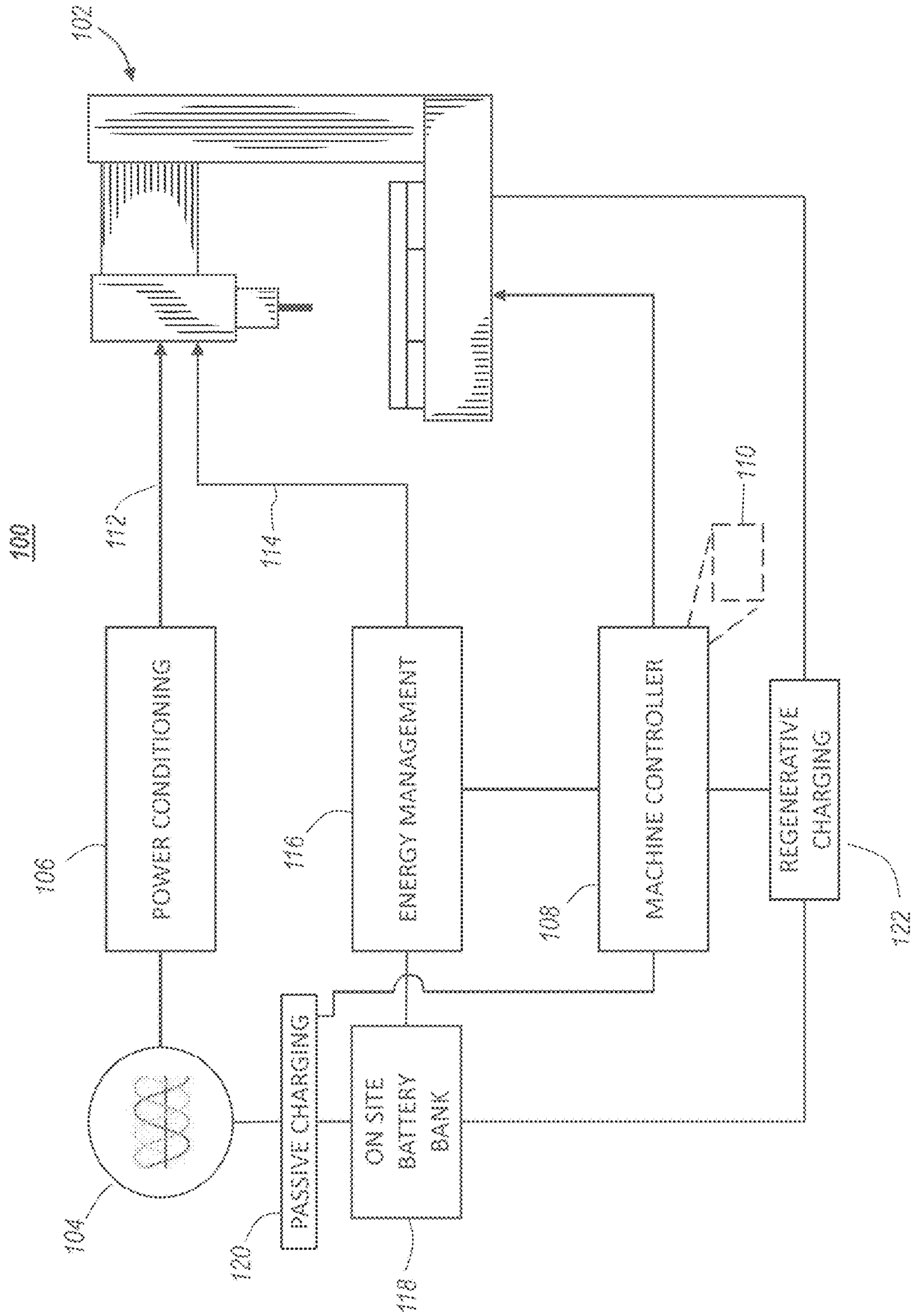
FIG. 1 shows a schematic diagram of a machine system that is capable of proactively providing supplemental power to the machine in order to accomplish an operation in the process of machining a part from a workpiece, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient proactive power augmentation system and method for numerically controlled machine tools, addressing the limitations of conventional reactive power supplementation approaches. Embodiments of the invention enable temporary power surges during high-demand machining operations by preemptively identifying such operations during computer-aided manufacturing (CAM) processing and embedding corresponding commands in the machine instruction code (e.g., G-code) to activate a secondary energy storage source immediately prior to execution. This anticipatory mechanism eliminates delays inherent in load-sensing methods, thereby preventing tool chatter, vibration, suboptimal speeds, and potential workpiece damage while achieving enhanced material removal rates and torque beyond the continuous rating of the primary grid supply. In addition, embodiments of the invention incorporate regenerative and passive recharging strategies to efficiently replenish the secondary source during low-demand phases, ensuring sustained performance without necessitating facility electrical upgrades. The system is adaptable to various motor configurations and machine types, offering a retrofittable solution for improved productivity and process stability.

FIG. 1 shows a schematic diagram of a machine system 100 that is capable of proactively providing supplemental power to the machine in order to accomplish an operation in the process of machining a part from a workpiece, in accordance with some embodiments. The system 100 includes a numerically controlled machine 102 that is operable by a machine controller 108 to carry out machining operations using one or more different tools. As used herein, the term "tool" refers to the implement that interfaces with raw material to produce a finished part from the raw material. In some cases, the tool can be a cutting tool that removes material from a workpiece or blank. In some cases, the tool can be a grinding tool or a polishing tool that are used to refine surfaces created as a result of cutting tools. For cutting and grinding tools, the machines rotates the tool in a chuck to perform milling operations such as drilling, routing, and other rotary cutting operations. These are examples of subtractive tools because they subtract material from the workpiece. However, a tool can also be used to operate additively, such as a nozzle that provides material into a space to create, or add to a part. In some cases, material can be added by welding, and in those cases the tool is the welding tip. These are all examples of tools that can be numerically controlled to move precisely in a space to remove material from a workpiece or to add material to a space or a workpiece.

The machine controller 108 controls the movement of the machine 102 according to a set of instructions 110. For example, this code 110 is commonly formatted in what is known as G-code. G-code is generated, in part, from a computer aided drawing (CAD) file that describes the finished part. The CAD file is processed by computer aided manufacturing (CAM) software that, along with tooling selection and setup information, generates a toolpath file. The setup information includes dimensions of the workpiece that is to be operated on for subtractive cutting/milling operations. For additive operations the CAD file is converted to layers for an extruder or laser path. Both systems use G-code which includes machine commands for motion, position, rotation speed, provision of cooling (e.g. oil or water spray), and other parameters that control machine operation. Thus, the proactive command to enable the secondary power source in machine instruction code, such as G-code, are generated during computer-aided manufacturing processing to anticipate high-demand operations.

In addition, the code is augmented with instructions to control power supplementation in a proactive manner, and to control passive recharging of the secondary power source battery when the machine is drawing power at a level below a predefined threshold. In the process of defining operations, certain operations that will benefit from having supplemental power provided to the machine can be identified. For example, when roughing out a workpiece using a cutting operation to remove a significant amount of material, it can be beneficial to drive the machine above its continuous operation power rating for the duration of the operation, for example when operations requiring torque at higher than average torque, and then return to ordinary power for a subsequent operation.

In the system 100 there is a main or primary power source 104 that is configured to supply power, for example, commercial alternating current (AC) power for most normal machining operations. This can be three phase electric service. The main power source can be conditioned by a power conditioning circuit 106 that can rectify the AC to DC (direct current), if necessary, as well as to protect against undesirable transients that may be propagated on the commercial service lines. The conditioned power is supplied to the machine 102 as the primary source of power for performing ordinary operations. The machine 102 is a numerically controlled machine tool system. The power can be provided, for example, in a primary DC (direct current) power buss 112. The system 200 also includes a secondary or supplemental power source 18, which can be a battery bank, a lithium-titanate (LTO) battery module, an ultracapacitor bank, or a hybrid storage unit. The secondary power source 118 is an energy storage device, such as a battery or a hybrid battery and supercapacitor, which can be passively charged 120 from the main power source using conventional battery charging technology when the power drawn from the primary power source by the machine 102 is below a pre-defined threshold that ensure that the power required by the machine 102 and for passive recharging does not exceed a given power rating. Power from the secondary power source 118 can be provided to the machine 102 by an energy management 116 circuit that is controlled by the machine controller 108. When, in performing the instruction code 110, the machine controller processes an instruction to proactively provide secondary power to the machine, the machine controller 108 controls the energy management circuit 116 to connect power from the secondary power source 118 to the machine 102 via line 114 which can connect to the primary DC power bus 112 via a module connection, or to the machine 102 via an auxiliary drive interface. The energy management circuit 116 can operate as a controllable switch, allowing or preventing power from the secondary power source 118 to flow to the machine 102, as well as regulate the power, if necessary. For example, the energy management circuit 116 can provide electric current at a regulated voltage level to the machine 102. Again, this happen before, and preferably immediately prior to, conducting the operation that had been previously identified as benefitting from having the supplemental power. The supplemental power can be used to, for example, drive the rotation of the tool faster in anticipation of a difficult operation that might otherwise result in tool chatter or other undesirable effect if only the primary power is used. A regenerative charging circuit 122 can be used to recover some of the power from the momentum of the tool and spindle when the supplemental power is turned off (e.g. removed from line 114) and charge the battery bank with the recovered charge. This operation can also brake the spindle of the machine to bring it back to a lower spin rate. By proactively providing supplemental power, the efficiency of the machining is improved, and the risk of a tool breaking due to chatter or other vibrations, or the load on the tool causing the rotational speed to drop below an optimum rate, is avoided. Further, the delay of reactive power supplementation, where power is provided in response to detecting an increased load, (which necessarily must occur after the machine is adversely loaded), is avoided.

In some embodiments, rather than having a passive recharging circuit 120, the regenerative charging 122 can be used to recharge the secondary power source 118 during operation of the machine for periods when the power demand is below a preselected threshold. In that way, the secondary power source 118 can be maintained and recharged effectively from the main power source 104 without a direct connection to the main power source 104. The instruction code 110 can also specify when such regenerative recharging is to occur, causing the machine controller 108 to enable or disable the regenerative charging circuit 122 accordingly.

Figure 2:
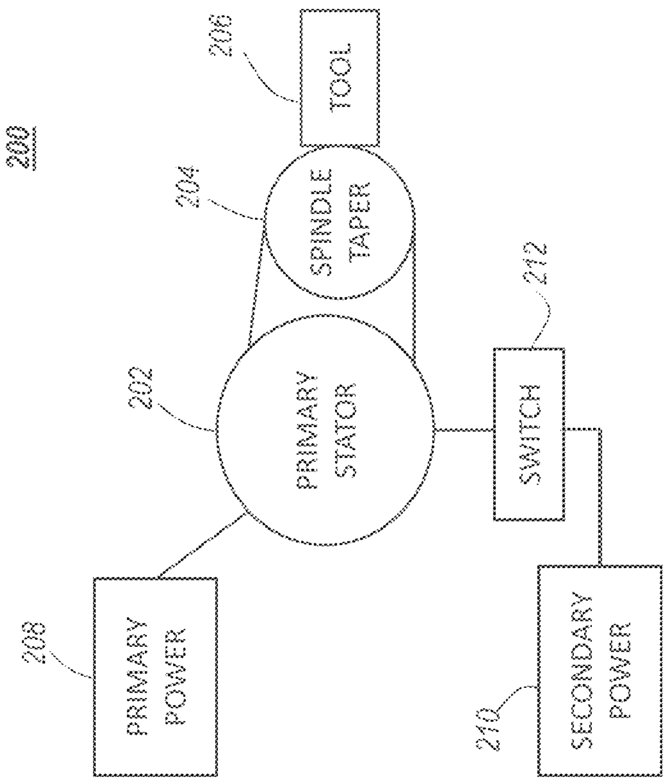
FIG. 2 shows a schematic diagram of a single motor, single stator machine system configured to proactively use supplemental power for specific operations while machining a part from a workpiece, in accordance with some embodiments.
Figure 3:
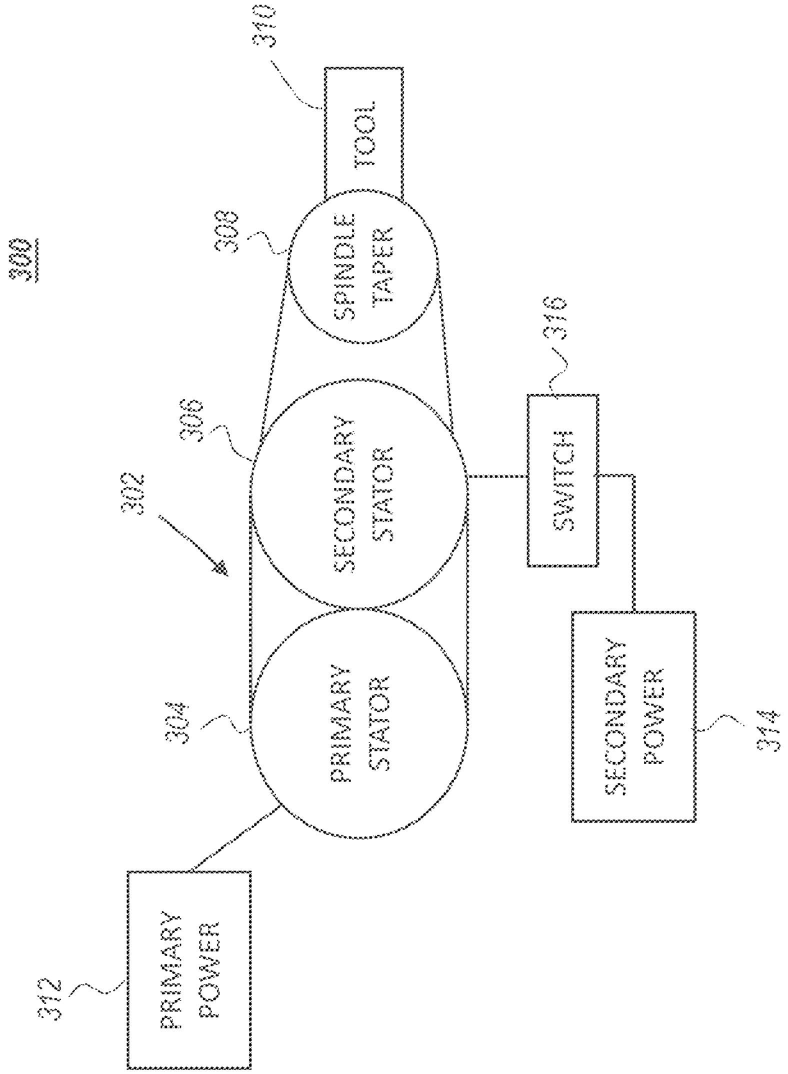
FIG. 3 shows a schematic diagram of a single motor, dual stator machine system configured to proactively use supplemental power for specific operations while machining a part from a workpiece, in accordance with some embodiments.
Figure 4:
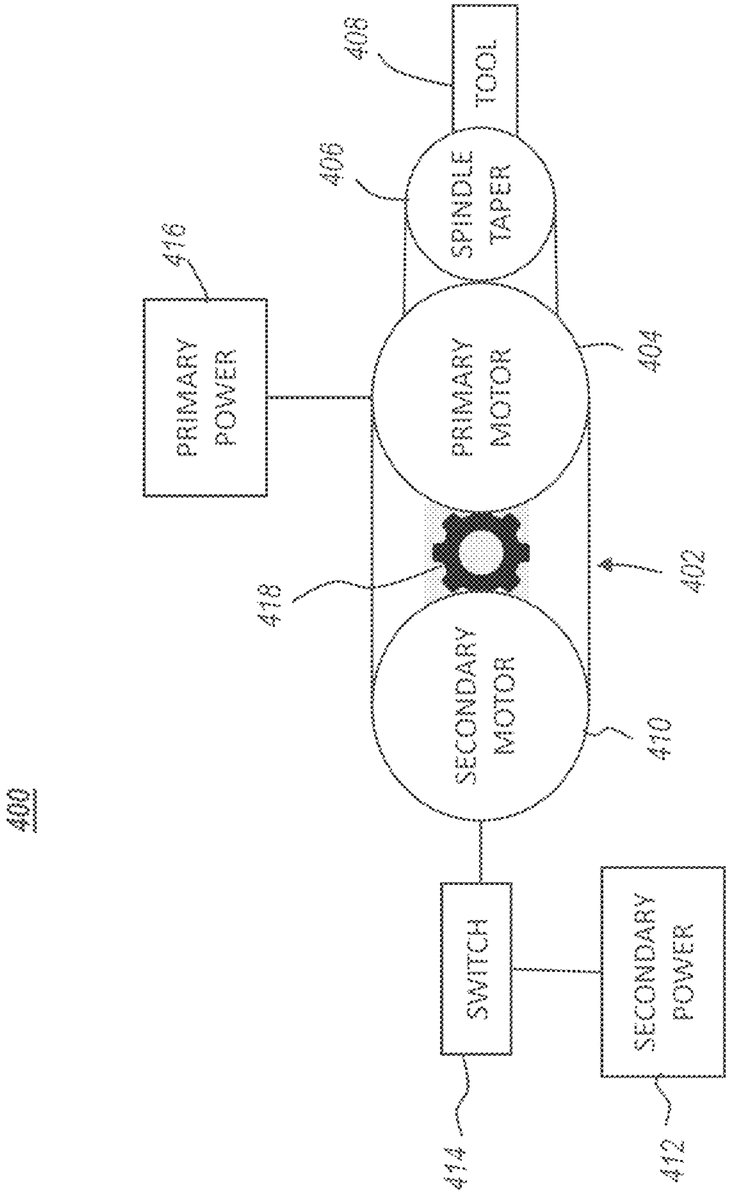
FIG. 4 shows a schematic diagram of a dual motor machine system configured to proactively use supplemental power for specific operations while machining a part from a workpiece, in accordance with some embodiments.

FIGS. 2-4 show several examples of different types of drive systems for computer numerically controlled (CNC) machines that can benefit from the inventive disclosure. Other arrangements will be known to those skilled in the field of CNC machines.

FIG. 2 shows a schematic diagram of a single motor, single stator machine system 200 configured to proactively use supplemental power for specific operations while machining a part from a workpiece, in accordance with some embodiments. In this system 200, there is a single motor with only a primary stator 202. The motor drives the spindle taper 204, which can include a chuck, to drive a tool 206. Since there is only a single motor and a single stator, both the primary power and the secondary power are provided to the primary stator 202. Or to the motor, more generally. A switch 212 can be used to gate the secondary power to the motor proactively, immediately prior to the machine needed the additional power to maintain optimal tool operation, in accordance with the instruction code performed by the machine controller.

FIG. 3 shows a schematic diagram of a single motor, dual stator machine system 300 configured to proactively use supplemental power for specific operations while machining a part from a workpiece, in accordance with some embodiments. In this system 300 the motor 302 has both a primary stator 304 and a secondary stator 306 that, together, turn to drive the spindle 308 and thereby the tool 310. The primary power source 312 (e.g. AC mains) provides power to the primary stator 304, which, when it rotates, also turns the secondary stator 306, even when no power is provided to the secondary stator 306. For ordinary machining operations, the power needed to drive the tool 310 can be completely provided by the main power source 312. At times when additional power is needed, power from a secondary source 314 (e.g. on-site batteries) can be proactively provided to the secondary stator 306 through, for example, a switch 316, which can be controlled by the machine controller in response to following instruction code for making a finished part.

FIG. 4 shows a schematic diagram of a dual motor machine system 400 configured to proactively use supplemental power for specific operations while machining a part from a workpiece, in accordance with some embodiments. The system 400 includes a motor system 402 that has a primary motor 404 that operates a spindle taper 406 to drive a tool 408. The primary motor 404 is powered from a primary power source 416 (e.g. AC mains). The primary motor, as powered by the primary power source 416 alone, is capable of most of the machining operations, especially the fine machining operations. That is, the primary motor 404 is capable of providing enough torque when powered only by the primary power source 416 to perform most machining operations, and without needed to exceed, for example, an operating rating that is established for continuous operation of the primary motor 404. However, there can be some machining operations where the power output of the system into the tool would benefit from additional power. High speed roughing operations and other high material removal rate operations, for example, where substantial amounts of material need to be removed from a workpiece, would benefit from additional power. Accordingly, these operations are identified in the generation of the G-code so that the additional power can be provided proactively. For example, immediately prior to performing such an operation, as indicated in the code performed by the machine controller enables a secondary motor 410 through a control circuit 414 to operate using a secondary power source 412. The secondary motor 410 can couple to the primary motor 404 through a coupling or coupling mechanism 418, such as gearing and/or a clutch. The coupling can allow disengagement of the secondary motor 410 from the primary motor 404 during machining operations that do not require the secondary motor 410.

Figure 5:
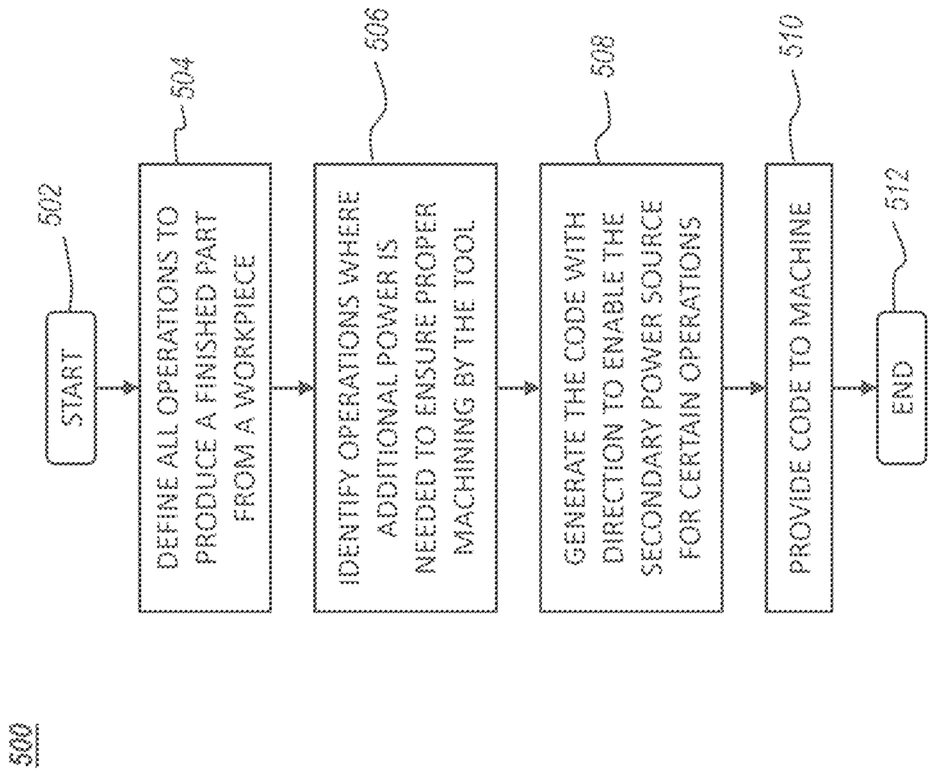
FIG. 5 shows a flow chart diagram of a method of generating machine instruction code to proactively use supplemental power for specific operations while machining a part from a workpiece, in accordance with some embodiments.

FIGS. 3-5 represent some examples of CNC machining systems that can be proactively provided with supplemental power to perform certain machining operations that, to be performed optimally, call for power beyond what the system, or a primary component of the system, is rated to operate at on a continuous basis. Those skilled in the art will realize that the exemplified machines can include, for example, boring machines, bridge mills, gantry mills, grinding machines, portal mills, a vertical machining center (VMC), a horizontal machining center (HMC), and the like. It will be further appreciated that, while the machines of FIGS. 2-4 exemplify machines that work on a static workpiece, the invention can apply equally to other types of machines, such as, for example, lathes. A lathe rotates the workpiece and a cutting tool can be applied to the rotating workpiece. The machining system (e.g. 102) can have built-in limitations on the primary component that prevent it from simply using more power from the primary power source to prevent damage to the primary component. It is also true that the average power draw of the machining system may be limited so as not to overload the power grid. The system does not respond to an increased load as a trigger to provide additional power from a secondary source; rather, the system has predefined those operations that will benefit from the additional power and proactively enables the secondary power source immediately prior to the operation. This allows the operations to be arranged, in time, in a way that minimizes stress on the system as a whole. The high power operations can be arranged to be performed with other operations between them to allow some cool down, for example. In addition, all of the systems, as indicated in FIG. 1, can use regenerative charging after the high power operations are completed to recover some of the energy put into the system to perform the high power machining operations.

FIG. 5 shows a flow chart diagram of a method 500 of generating machine instruction code to proactively use supplemental power for specific operations while machining a part from a workpiece, in accordance with some embodiments. At the start 502 a CAD file for a finished part is provided, along with a definition of a blank workpiece or stock from which the finished part is to be produced, in a subtractive operation. In an additive manufacturing system, a workpiece is not provided. In step 504 a CAM system defines all of the operations that are needed to produce the finished part. In a subtractive system, this includes identify the tools needed for each operation. In an additive system, the finished part is sectioned into layers that are to be laid and the position of the material to be added in each layer are defined. In step 506, the operations that would benefit from additional power are identified, and in step 508 the instruction code is generated to define all operations, tool changes, tool movement, tool speed, etc., as well as when supplemental power is to be enabled and disabled, proactively for particular operations. In step 510 the code is provided to a machine controller. Ordinarily a test can be run to ensure that the code has been correctly generated. If there are any issues found in the test, then portions of the method 500 can be repeated to refine the machine code to be used in manufacturing finished parts.

Figure 6:
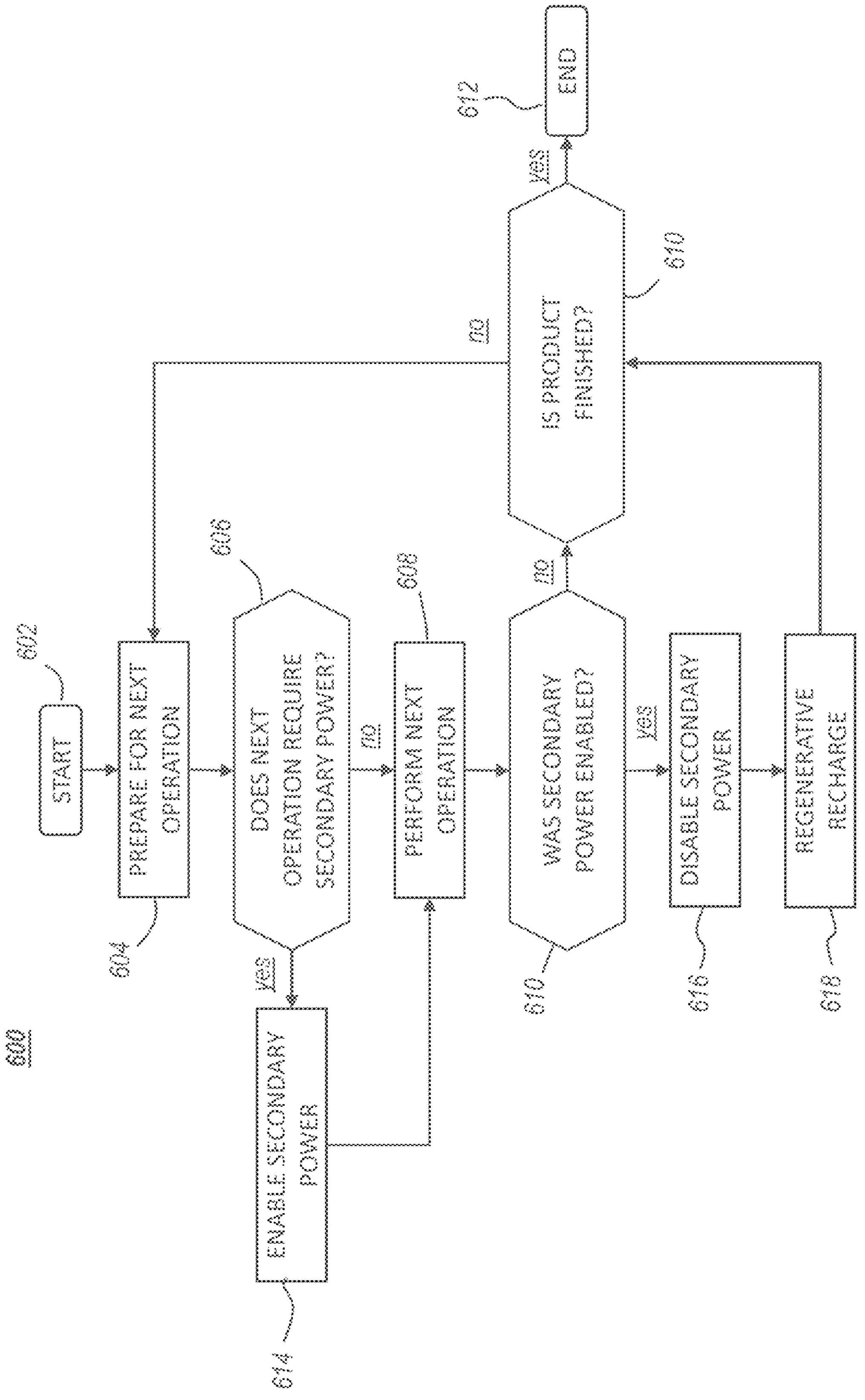
FIG. 6 shows a method for proactively and selectively providing supplemental power to a machine for specific operations while machining a part from a workpiece, in accordance with some embodiments.

FIG. 6 shows a method 600 for proactively and selectively providing supplemental power to a machine for specific operations while machining a part from a workpiece, in accordance with some embodiments. At the start 602 method 500 has been performed and finished, tested machine control code (e.g. G-code) has been produced and is provided to the machine controller. In performing the code, the machine controller, in step 604 prepares for the next machining operation. Since the method 600 is iterative, the “next” operation in step 604 includes the first operation. In step 604 the machine can select a tool to be used, position the machine relative to the workpiece or additive platform to perform the next operation. In performing the code, in step 606, the machine controller determines, as would be indicated by the code, whether additional power is needed to perform the next operation, as indicated by the code being performed. If the code indicates that the next operation requires the additional, secondary power, then the method 600 proceeds to step 614 in which, prior to beginning the next machining operation, the machine controller proactively enables the secondary power source, meaning the secondary power source is connected to the machine to increase to power of the system. Then, in step 608, the next operation is then performed. Of course, in step 606, if the secondary power source is not needed for the next operation, the method simply proceeds directly from step 606 to step 608 without enabling the secondary power source.

After the operation is carried out by the machine, then in step 610 the machine controller determines whether the secondary power source was enabled (e.g. in step 614), and if not, then the method 600 proceeds to step 610 where it is determined whether the part is finished (all of the operations completed). If so, then the method ends 612. If there are more operations to be completed, the method 600 loops back to step 604. If, in step 610, it is determined that the secondary power source had been enabled for the recently finished operation, then in step 616 the secondary power source is disabled, meaning disconnected from the machine, and in step 618 any regenerative recharging that can be enabled from the motion of the machine (rotation) is carried out as the machine resumes normal power operation. In some embodiments the regenerative recharging can overlap in time with the next operation being performed. Thus, the method 600 indicates how the machine proactively provides supplemental power for those operations that benefit from supplemental power, which avoids the conventional delay associated with sensing loading on the machine, for example, and reactively providing supplemental power in response to sensing an excess loading on the machine.

Figure 7:
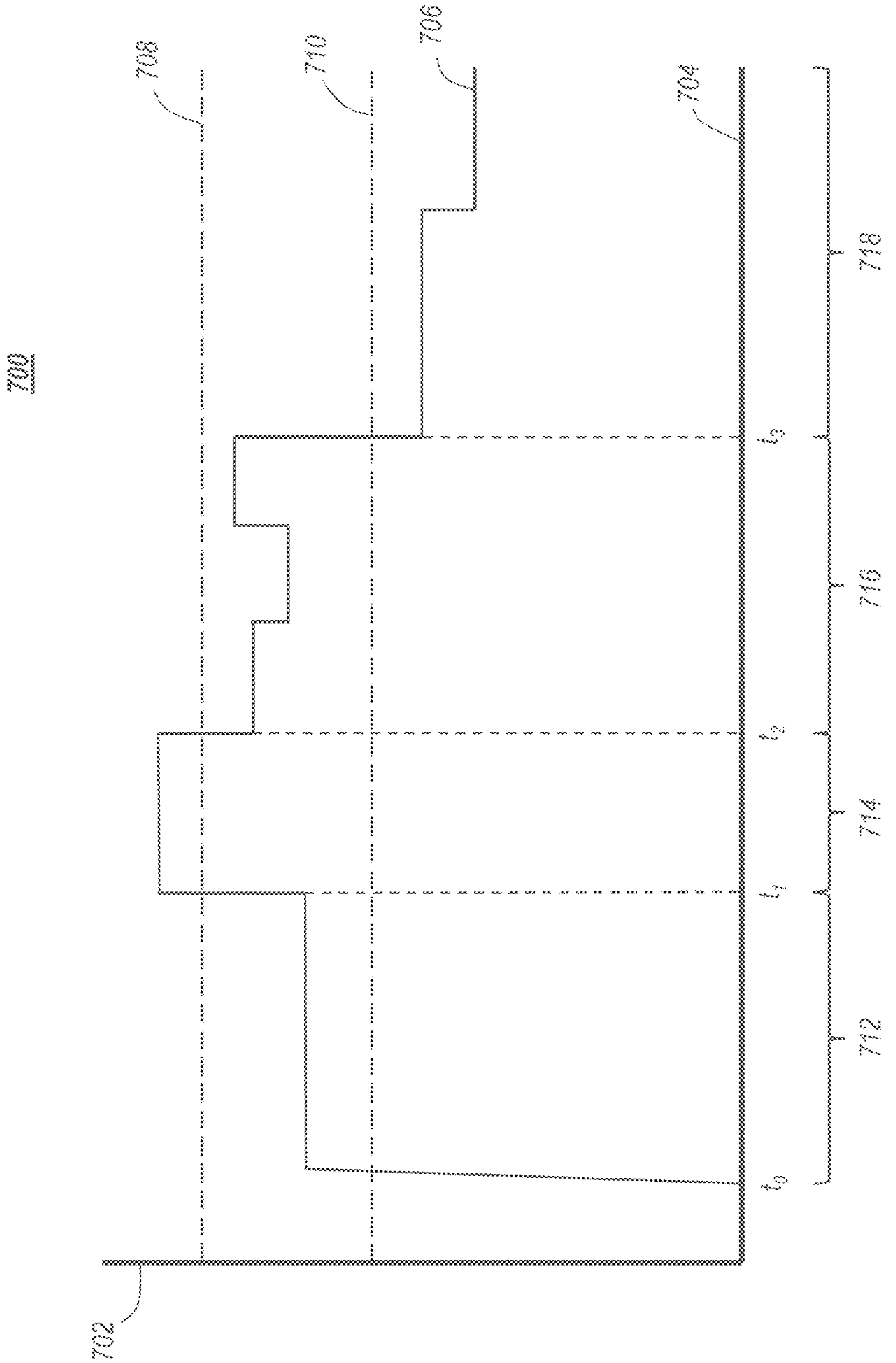
FIG. 7 shows a graph chart illustrating various operating mode of a CNC machine that is capable of proactively providing supplemental power to the machine to carry out certain operations, in accordance with some embodiments.

FIG. 7 shows a graph chart 700 illustrating various operating mode of a CNC machine that is capable of proactively providing supplemental power to the machine to carry out certain operations, in accordance with some embodiments. The chart includes a vertical axis 702 that represents power used by the machine, and a horizontal axis 704 that represents time during the machining of a finished part. The power provided to the machine is represented by plot line 706. A first power threshold 708 represents a maximum continuous power rating of the machine, meaning that the machine cannot be operated at power levels above this threshold 708 continuously, or for a specified period of time which is assumed to be equivalent to continuous operation. The lower threshold 710 represents a power level at which some power can be diverted to recharging the secondary power source using regenerative charging, meaning the primary power source is used to complete a machining operation and the movement of the motor is used to generate charge for the secondary power supply. The machining begins at time to where the power level is seen rising from zero to a level between the two thresholds 708, 710 for a duration period 712 to time $t_1$. At the end of time 712, the machine controller, in preparation for the next machining operation, enables the secondary power source, and as a result, the total power in the machine is above the upper threshold 708 for a duration of time 714 to time $t_2$. At the end of time 714, the secondary power source is disabled as not being needed for subsequent machining operations from time $t_2$ to time $t_3$ over duration 716 in which three machining operations are conducted that do not require the secondary power source. Then, after time $t_3$, further machining operations are conducted where the power level needed is below threshold 710 over time duration 718, which represents periods of low power demand. During this time 718, because there is excess power available, the secondary power source can be recharged from the machine using the primary power source. Or alternatively, power can be diverted from the primary power source to the secondary power source (e.g. through passive charging circuit 120 of FIG. 1). That is, during times when a sufficient amount of power is required from the primary power source, as in durations 712, 714, 716, there is not enough power that can be diverted to recharging the secondary power source, and that threshold is indicated by threshold 710. But when the machining operation power requirement is below the threshold 710, then power can be diverted from the primary power source to the secondary power source without compromising the effectiveness of the machining operation being performed at that time. This is important in a manufacturing setting where the CNC machine may be running nearly continuously to produce finished parts serially.

Figure 8:
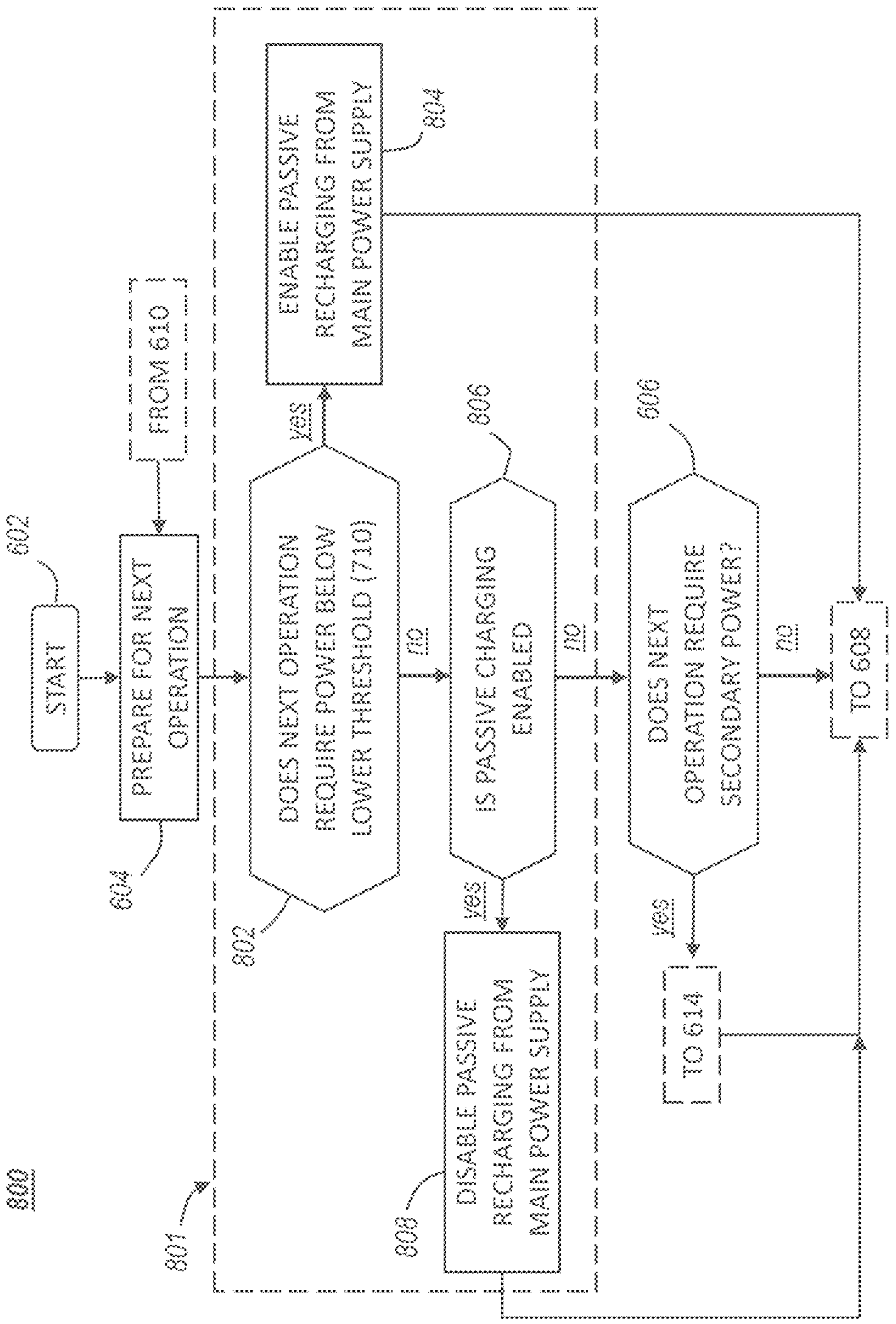
FIG. 8 is a flow chart diagram of a modification to the method of FIG. 6 to illustrate the use of passive recharging during machining operations.

FIG. 8 is a flow chart diagram of a modification 800 to the method of FIG. 6 to illustrate the use of passive recharging during machining operations. Block 801 is inserted between steps 604 and 606, and controls the use of passive charging during machining operations of the secondary power source (e.g. 118). Upon performing step 602, in step 802, the modified method 800 determines whether the next operation, or a series of next operations, will require a power level that is below a given threshold, such as threshold 710. This threshold can be, for example, 20% below the continuous operation power rating of the machine (e.g. 708). The threshold can be lower or higher in other embodiments. If the intended operation, or upcoming series of operations, will require a power level that is below the selected threshold, then the machine controller (e.g. 108) can enable (or continue if already enabled) passive recharging in step 804 by, for example, controlling the passive charging circuit 120 to recharge the secondary power source from the same source that powers the machine. The term "passive charging" as used here simply means non-regenerative charging; power from the primary power source is used to recharge the battery of the secondary power source in an otherwise conventional manner. If, in step 802, it is determined that the power demand of the upcoming operation exceeds the threshold, then the method 800 proceeds to step 806 where the machine controller determines whether passive charging is currently enabled. If so, then in step 808 the passive charging is disabled. Otherwise the method 800 proceeds to stop 606.

The proactive power augmentation invention disclosed herein represents a transformative advancement in numerically controlled machine tool performance. By preemptively enabling secondary energy storage through augmented machine instruction code—identifying and commanding high-demand operations such as heavy roughing during CAM programming—the system delivers instantaneous power boosts beyond primary grid limitations without any delay, eliminating reactive response issues like tool chatter, vibration-induced damage, suboptimal speeds, or workpiece defects. This approach dramatically increases material removal rates, shortens cycle times, and enhances overall throughput while maintaining process stability and tool longevity. Moreover, it achieves these gains without requiring costly facility upgrades, such as larger transformers, cables, or electrical service expansions, and supports energy efficiency through regenerative and passive recharging during lower-demand phases. Applicable across diverse machine types—from compact VMCs and HMCs to large gantry mills and turn-mill centers—the architecture is machine-independent and retrofittable, empowering OEMs to differentiate their platforms with a "surge-capable" drive system. Ultimately, this invention unlocks higher productivity, reduced operational costs, and greater manufacturing flexibility within existing infrastructure, advancing the state of the art in precision machining.

The claims appended hereto are meant to cover all modifications and changes within the scope and spirit of the present invention.

What is claimed is:

1. A method for operating a numerically controlled machine tool having a primary power source and a secondary power source, the method comprising:

receiving machine instruction code defining a sequence of machining operations, the machine instruction code including proactive directions to enable the secondary power source for selected operations;

preparing for a next operation in the sequence;

when the next operation requires the secondary power source, proactively enabling the secondary power source prior to performing the next operation;

performing the next operation using power from the primary power source and, if enabled, the secondary power source; and after performing the next operation, when the secondary power source had been enabled for the operation, disabling the secondary power source.

2. The method of claim 1, wherein proactively enabling the secondary power source occurs immediately prior to initiating tool motion or cutting for the next operation.

3. The method of claim 1, further comprising regeneratively recharging the secondary power source from kinetic energy of the numerically controlled machine tool, wherein the regenerative recharging overlaps in time with at least a portion of a subsequent operation that does not require the secondary power source.

4. The method of claim 1, further comprising passively recharging the secondary power source from the primary power source during periods of low power demand in the sequence of machining operations.

5. A numerically controlled machine tool system comprising:

a machine tool including a motor configured to drive a tool for performing machining operations on a workpiece;

a primary power source configured to supply power to the motor for normal machining operations;

a secondary power source comprising an energy storage device;

an energy management circuit coupled between the secondary power source and the motor, the energy management circuit including a controllable switch to selectively connect the secondary power source to the motor;

a machine controller configured to execute machine instruction code defining the machining operations, wherein the machine instruction code includes proactive commands to control the controllable switch; and wherein the machine controller is configured to interpret the proactive commands in the machine instruction code to proactively enable the switch and connect the secondary power source to the motor immediately prior to performing selected high-demand operations identified in the machine instruction code, and disable the switch after the selected machining operations.

6. The system of claim 5, wherein the motor includes a primary stator powered by the primary power source, and the energy management circuit is configured to couple the secondary power source to the primary stator via the controllable switch when enabled.

7. The system of claim 5, wherein the motor includes a primary stator powered by the primary power source and a separate secondary stator, and the energy management circuit is configured to supply power from the secondary power source to the secondary stator via the controllable switch when enabled.

8. The system of claim 5, wherein the motor is a primary motor, the system further comprising a secondary motor mechanically coupled to the primary motor via a coupling mechanism, wherein the secondary motor is powered by the secondary power source when the controllable switch is enabled.

9. The system of claim 5, further comprising a regenerative charging circuit configured to recharge the secondary power source from kinetic energy of the motor or tool after the controllable switch is disabled.

10. The system of claim 5, further comprising a passive charging circuit configured to recharge the secondary power source from the primary power source during periods when power demand is below a predefined threshold.

11. The system of claim 5, wherein the energy storage device comprises at least one of a battery bank, a lithium-titanate (LTO) battery module, an ultracapacitor bank, or a hybrid storage unit.

12. The system of claim 5, wherein the secondary power source is connected to a primary DC bus of the machine tool.

13. The system of claim 5, wherein the machine tool comprises at least one of a CNC milling machine, a vertical machining center (VMC), a horizontal machining center (HMC), a turning center, a turn-mill center, a bridge mill, a gantry mill, a portal mill, a grinding machine, or a boring machine.

14. The system of claim 5, wherein the proactive commands in the machine instruction code are generated during computer-aided manufacturing (CAM) processing to anticipate high-demand operations.

15. The system of claim 5, wherein the selected high-demand operations include roughing operations or operations requiring torque or power above a continuous rating of the primary power source.

16. The system of claim 5, wherein the energy management circuit is configured for retrofitting to existing machine tools via modular connections to the primary DC bus or auxiliary drive interfaces.

* * * * *